United States Patent [19]
Kalsi

[11] Patent Number: 5,862,028
[45] Date of Patent: *Jan. 19, 1999

[54] METHOD AND APPARATUS FOR DETECTING QUENCHING OF A COIL FOR A SUPERCONDUCTING MAGNET

[75] Inventor: Swarn S. Kalsi, Ft. Salonga, N.Y.

[73] Assignee: Northrop Grumman Corporation, Los Angeles, Calif.

[*] Notice: This patent issued on a continued prosecution application filed under 37 CFR 1.53(d), and is subject to the twenty year patent term provisions of 35 U.S.C. 154(a)(2).

[21] Appl. No.: 653,762

[22] Filed: May 24, 1996

[51] Int. Cl.[6] .................................................. H02H 7/00
[52] U.S. Cl. .............................................. 361/19; 505/850
[58] Field of Search ........................... 361/19, 141, 103; 505/850

[56] References Cited

U.S. PATENT DOCUMENTS

| | | | |
|---|---|---|---|
| 3,270,247 | 8/1966 | Rosner | 317/13 |
| 3,711,744 | 1/1973 | Luton, Jr. | 317/13 |
| 4,271,443 | 6/1981 | Nother | 361/19 |
| 4,688,137 | 8/1987 | Urata | 361/141 |
| 4,764,837 | 8/1988 | Jones | 361/19 |
| 4,777,437 | 10/1988 | Tashiro et al. | 324/248 |
| 4,855,859 | 8/1989 | Tixador et al. | 361/19 |
| 4,978,922 | 12/1990 | Mallick, Jr. et al. | 361/19 |
| 4,996,472 | 2/1991 | Mallick, Jr. | 324/71.6 |
| 5,218,505 | 6/1993 | Kubo et al. | 361/19 |
| 5,268,646 | 12/1993 | Doss | 324/633 |
| 5,303,111 | 4/1994 | Yamaguchi | 361/19 |
| 5,430,816 | 7/1995 | Furuya et al. | 385/33 |

*Primary Examiner*—Sally C. Medley
*Attorney, Agent, or Firm*—Terry J. Anderson; Karl J. Hoch, Jr.

[57] ABSTRACT

Quenching of a coil for a superconducting magnet is detected by placing a temperature sensor proximate the coil of the superconducting magnet and monitoring the temperature sensor for a rise in temperature of the coil of the superconducting magnet. AC and DC field variations of the coil of the superconducting magnet do not substantially adversely affect such temperature monitoring, thus facilitating reliable and accurate detection of such quenching. This accurate and reliable detection of quenching assures that the superconducting magnet can be shut down in a controlled manner, so as to prevent damage thereto when quenching occurs. The method and apparatus of the present invention finds particular use in maglev applications.

12 Claims, 1 Drawing Sheet

METHOD AND APPARATUS FOR DETECTING QUENCHING OF A COIL FOR A SUPERCONDUCTING MAGNET

FIELD OF THE INVENTION

The present invention relates generally to protection circuits for superconducting magnets and more particularly to a method and an apparatus for detecting quench in the coil of a superconducting magnet.

BACKGROUND OF THE INVENTION

Superconducting magnets for generating very powerful magnetic fields are well known. Such superconducting magnets find application in the suspension and propulsion systems of maglev (magnetic levitation) transportation systems, among other things. Such superconducting magnets are utilized in both electrodynamic suspension (EDS) and electromagnetic suspension (EMS) magnetic levitation systems. Superconducting magnets are extremely efficient when utilized in such applications since no energy is lost to resistive or joule heating along the superconducting current path.

However, every superconducting material has an associated critical temperature $T_c$ above which the material ceases to function as a superconductor and becomes a normal conductor within which joule heating occurs. This effect is known in the art as quenching.

As long as the region where such quenching occurs is small enough or receives sufficient cooling, then the heat produced by such normal resistance will dissipate and the material will generally resume a superconducting state.

However, if the region of joule heating is sufficiently large that the system's ability to dissipate heat is overwhelmed, then the area of loss of superconductivity will be maintained and will tend to grow in size. Such propagation of the region of normal conductivity typically results in catastrophic failure of the superconducting magnet, thereby potentially causing damage to the associated apparatus. This effect is particularly undesirable in maglev applications.

For example, if such catastrophic failure of the superconducting magnet were to occur when a maglev vehicle is traveling at a high speed, then undesirable contact of the vehicle with the track may result, potentially resulting in serious damage to the vehicle and/or the track.

When it is known that quenching has occurred, then the superconducting magnet can be shut down in a controlled and safe manner, thereby avoiding such damage. Thus, it is desirable to quickly and accurately identify the loss of superconductivity within the coils of superconducting magnets.

Various attempts at detecting the loss of superconductivity within a superconducting magnet have been tried in the prior art. Although such prior art detection schemes have proven generally suitable for their intended purposes, none address the particular problems of detecting loss of superconductivity within the coils of a superconducting magnet utilized in maglev applications.

The best of such prior art methodologies for detecting quenching of the coils of superconducting magnets measure a resistive voltage signal or phase change within the superconductive coil. Moreover, such methodologies are not feasible in maglev applications due to the extremely wide bandwidth of AC and DC field fluctuations associated therewith. For example, the DC field for providing base excitation in such maglev applications is approximately 1 Hz, which results from compensating for slow changes in the maglev vehicle loading; 10–20 Hz oscillations due to uneven air gap length between the iron poles and the rail; and up to 1.5 kHz oscillations due to air gap permeance variations caused by slots in the iron rail. As those skilled in the art will appreciate, a broad spectrum of field fluctuations makes it difficult to utilize quench detection techniques based upon voltage changes within the coil of the superconducting magnet. It is very difficult to identify those voltage changes which are caused solely by a temperature rise, as opposed to those having a contribution from such field fluctuations.

In view of the foregoing, it is desirable to provide means for reliably and accurately detecting quenching of the coil of a superconducting magnet utilized in maglev applications in a manner which is sufficiently timely to facilitate controlled shut down thereof.

SUMMARY OF THE INVENTION

The present invention specifically addresses and alleviates the above-mentioned deficiencies associated with the prior art. More particularly, the present invention comprises a method for detecting quenching of a coil of a superconducting magnet. The method generally comprises the steps of disposing a temperature sensor proximate the coil and monitoring the temperature sensor for a rise in temperature of the coil. AC and DC field variations of the coil of the superconducting magnet do not substantially adversely affect such temperature monitoring, thus reliable and accurate detecting of quenching is facilitated. The temperature sensor preferably comprises a sensor which is capable of operating over a wide range of temperatures and which is capable of operating within strong magnetic fields. According to the preferred embodiment of the present invention, a carbon glass resistor temperature sensor is utilized. As those skilled in the art will appreciate, the resistance of such carbon glass resistor temperature sensors is very high at room temperature, e.g., approximately 4 k ohm and falls sharply as the measured temperature increases.

A substantially constant current is passed through the carbon glass resistor to develop a voltage drop thereacross. The constant current assures that a corresponding constant voltage drop is developed across the carbon glass resistor for a given temperature. The voltage drop across the carbon glass resistor is compared with a reference voltage which is representative of a desired operating temperature of the coil of the superconducting magnet.

When the difference between the voltage drop across the carbon glass resistor and the reference voltage exceeds a predetermined limit, then a latching relay is triggered so as to effect reduction of current flow through the superconducting coil. According to the preferred embodiment of the present invention, the latching relay effects the opening of a circuit breaker in the superconducting coil power supply circuit, so as to effect substantially instantaneous shut down of the superconducting magnet.

Further, according to the preferred embodiment of the present invention, the voltage drop across the carbon glass resistor and the reference voltage are applied to a differential amplifier so as to facilitate a comparison thereof. The voltage drop across the carbon glass resistor is amplified, as desired, prior to being applied to the differential amplifier. Such amplification of the voltage drop prior to comparison mitigates susceptibility to electrical noise and enhances the accuracy of the comparison process.

These, as well as other advantages of the present invention, will be more apparent from the following descrip-

DETAILED DESCRIPTION OF THE PREFERRED EMBODIMENT

Figure 1:
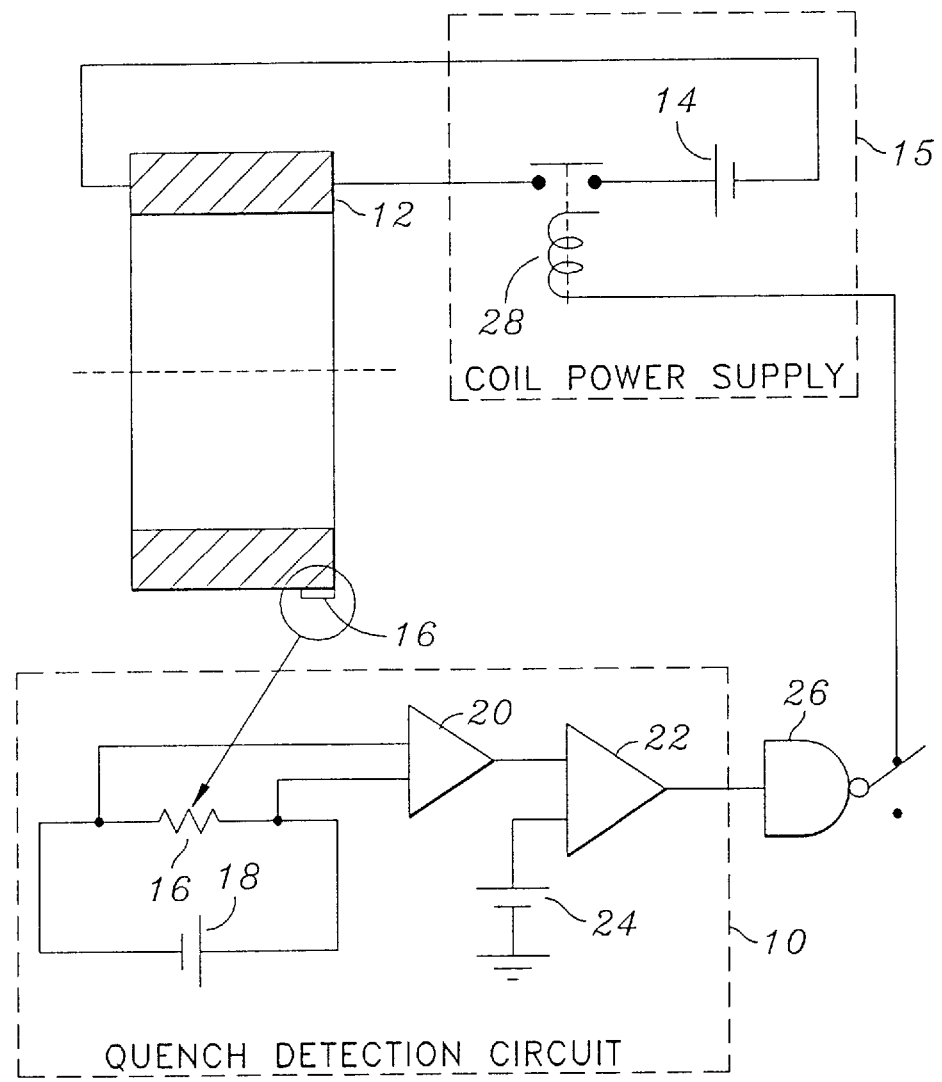
FIG. 1 is an electrical schematic of the circuit for detecting quenching of a superconducting coil, according to the present invention.

The detailed description set forth below in connection with the appended drawings is intended as a description of the presently preferred embodiment of the invention, and is not intended to represent the only form in which the present invention may be constructed or utilized. The description sets forth the functions and the sequence of steps for constructing and operating the invention in connection with the illustrated embodiment. It is to be understood, however, that the same or equivalent functions may be accomplished by different embodiments that are also intended to be encompassed within the spirit and scope of the invention.

The circuit 10 for detecting quenching of a superconducting coil 12 of the present invention is illustrated in FIG. 1, which depicts a presently preferred embodiment of the invention. Referring now to FIG. 1, circuit 10 generally comprises a temperature sensor, preferably a carbon glass resistor temperature sensor 16, which is disposed on or near the superconducting coil 12, so as to reliably and accurately measure temperature fluctuations therein.

A constant current power supply 18 provides constant current to the carbon glass resistor 16, so as to assure a constant voltage drop thereacross in the absence of any temperature changes therein. The voltage drop across the carbon glass resistor temperature sensor 16 is preferably amplified by amplifier 20.

The amplified carbon glass resistor temperature sensor 16 output is communicated to the differential amplifier 22 which also receives a reference voltage from reference voltage source 24. The reference voltage is set to a value which is representative of the desired temperature of the superconducting coil 12, such that the input to the differential amplifier 22 is substantially balanced when the desired temperature is maintained and such that the input to the differential amplifier 22 becomes imbalanced when the temperature of the superconducting coil 12 rises, thereby causing the differential amplifier 22 to output a signal in response to such imbalanced inputs.

According to the preferred embodiment of the present invention, the differential amplifier 22 provides an output signal to a latching relay 26 when such an imbalance of the input is sensed, thereby indicating that the temperature of the superconducting coil 12 has reached a predetermined limit. In response to receiving such an output signal from the differential amplifier 22, the latching relay 26 preferably energizes a circuit breaker 28 in the superconducting magnet coil power supply circuit 15, thus removing power therefrom and thereby de-energizing superconducting coil 12, so as to prevent damage thereto, as may occur due to runaway loss of superconductivity.

As those skilled in the art will appreciate, superconducting magnets utilized in maglev applications continuously experience AC fields of random frequencies which are generated during the normal operation thereof. Electrodynamic suspension maglev systems utilize passive shielding to isolate superconducting magnet coils from such AC fields which occur above a predetermined frequency. Electromagnetic suspension maglev systems utilize an active shielding which is continuously controlled in an attempt to minimize AC fields experienced by the superconducting magnet coil. In both types of maglev systems, i.e., electrodynamic suspension and electromagnetic suspension, substantial residual AC fields exist in the superconducting magnet coil even though such passive and active shielding is utilized. The presence of these fluctuating AC fields makes it extremely difficult to employ quench detection techniques based upon the comparison of voltages and/or phase differences across selected sections of the superconducting magnet coil.

The methodology of the present invention is particularly advantageous when utilized in conduction cooled superconducting magnet systems, which exhibit a rapid rise of the coil temperature following a quench initiation. The methodology of the present invention may also be utilized for superconducting magnet systems utilizing other cooling methodologies, such as pool-boiling, forced cooling, etc.

According to the preferred embodiment of the present invention, the quench detection circuit of the present invention is utilized upon a low-temperature superconducting (LTS) iron-cored magnet of a maglev vehicle. Such a magnet design employs a hybrid excitation for each pole. It consists of a controlled current, low-temperature superconducting coil for primary excitation and a normal-conducting control coil for adjustment of total excitation in either a buck or boost mode.

In the electromagnetic suspension system, during normal operation thereof, the superconducting magnet is supplied with power from a constant current power supply which maintains constant current in the superconducting coil irrespective of the coil's resistance. If a region of normal resistance develops within the superconducting coil, then joule heating within the zone of normal resistance increases rapidly because the resistance of the superconducting wire increases rapidly as a function of temperature. It is therefore essential to quickly detect the transition of the superconducting coil from a superconducting state to a normal conducting state and then to interrupt power thereto rapidly.

The temperature of the zone of normal condition is given by the formula;

$$\int_0^t R(\theta) I^2(t) \, dt = \int_0^\theta m \, C_p(\theta) \, d\theta$$

The left-hand side of the above equation represents joule heating in the zone of normal condition of the superconducting coil from time 0 to time t. Two components of such heating include a rapidly increasing resistance (R) as a function of temperature ($\theta$), and the coil current (I) which is a function of time (t). The right-hand side of the equation shows the mass (m) of the normal zone, specific heat ($C_p$) of the superconducting material in the zone of normal conductivity, which is a function of temperature, and temperature rise ($d\theta$) of the zone of normal conductivity. This equation must be solved for a given superconducting coil, so as to determine the safe limits for the coil current and the temperature rise. Based upon the safe limits determined for coil current and temperature rise, the parameters for the differential amplifier are selected.

According to the present invention, a quench detection circuit which is unaffected by AC ad DC magnetic fields and which utilizes temperature sensors for detecting quenching of the superconducting magnet coil is provided. It is understood that the exemplary circuit for detecting quenching of a superconducting magnet coil described herein and shown in the drawings represents only a presently preferred embodiment of the invention. Indeed, various modifications and additions may be made to such embodiment without departing from the spirit and scope of the invention. For example, as those skilled in the art will appreciate, various different sensors and circuits for conditioning and interpreting the output of the sensor are likewise suitable. Also, it is contemplated that various responses to the output of the circuit for detecting quench of a superconducting magnetic coil may be provided. For example, rather than instantaneously removing all power from the superconducting coil experiencing quenching, it may be desirable to gradually reduce the power thereto instead. It is also contemplated that additional cooling may be provided to the quenched coil. Thus, these and other modifications and additions may be obvious to those skilled in the art and may be implemented to adapt the present invention for use in a variety of different applications.

What is claimed is:

1. An apparatus for detecting the quenching of a coil for a superconducting magnet, the apparatus comprising:

a variable resistive temperature sensor disposed proximate the coil of the superconducting magnet and operable to generate an output voltage which is proportional to the temperature of the coil when a current is supplied to the temperature sensor; and a quench detection circuit in direct electrical communication with the temperature sensor and comprising:

a substantially constant current source electrically connected to the temperature sensor for supplying current thereto; and a monitoring circuit electrically connected to the temperature sensor for reading the output voltage of the temperature sensor;

wherein AC and DC field variations of the coil of the superconducting magnet do not substantially adversely affect the reading of the output voltage by the monitoring circuit, thus facilitating reliable and accurate detection of the quench.

2. The apparatus of claim 1 wherein the temperature sensor comprises a carbon glass resistor which produces a voltage drop in the quench detection circuit corresponding to the temperature of the coil of the superconducting magnet.

3. The apparatus of claim 2 wherein the monitoring circuit is operable to compare the voltage drop across the carbon glass resistor to a reference voltage source representative of a desired operating temperature of the coil of the superconducting magnet.

4. The apparatus of claim 3 further comprising:

a power supply electrically connected to the coil for supplying current thereto;

a latching relay electrically connected to the monitoring circuit and responsive to a difference in the voltage drop across the carbon glass resistor and the reference voltage source such that the latching relay is triggered when the difference exceeds a predetermined limit; and a circuit breaker electrically connected to the coil, the latching relay, and the power supply;

the circuit breaker being openable by the latching relay to reduce current flow from the power supply through the coil when the difference between the voltage drop and the reference voltage exceeds the predetermined limit.

5. The apparatus of claim 3 wherein the monitoring circuit comprises a differential amplifier electrically connected to the temperature sensor and the reference voltage source.

6. The apparatus of claim 5 wherein the monitoring circuit further comprises an amplifier electrically connected to the differential amplifier and the temperature sensor for amplifying the voltage drop across the carbon glass resistor prior to electrically communicating the voltage drop to the differential amplifier.

7. A method for detecting the quenching of a coil of a superconducting magnet, the method comprising the steps of:

(a) disposing a variable resistive temperature sensor proximate the coil;

(b) supplying a substantially constant current to the temperature sensor so as to cause the temperature sensor to generate an output voltage which is proportional to the temperature of the coil; and (c) monitoring the temperature of the coil by reading the output voltage of the temperature sensor via a quench detection circuit which is in direct electrical communication with the temperature sensor.

8. The method of claim 7 further comprising the step of:

(d) reducing the flow of current to the coil when the temperature thereof exceeds a desired operating temperature.

9. The method of claim 8 wherein step (b) comprises supplying current to the temperature sensor from a current source of the quench detection circuit.

10. The method of claim 8 wherein:

step (b) comprises producing a voltage drop across the temperature sensor which is generated therefrom as the output voltage; and step (c) comprises comparing the output voltage to a reference voltage representative of the desired operating temperature of the coil.

11. The method of claim 10 wherein the quench detection circuit includes a differential amplifier for comparing the output voltage to the reference voltage, and step (c) comprises amplifying the output voltage from the temperature sensor prior to the transmission thereof to the differential amplifier.

12. The method of claim 10 wherein step (d) comprises:

(1) triggering a latching relay which is electrically connected to the quench detection circuit and responsive to a difference between the output voltage and the reference voltage when the difference exceeds a predetermined limit; and (2) opening a circuit breaker which is electrically connected to the latching relay and operative to reduce the flow of current through the coil when opened.

* * * * *